United States Patent [19]
Williams

[11] Patent Number: 5,863,430
[45] Date of Patent: Jan. 26, 1999

[54] DRILLING MUD SEPARATION SYSTEM WITH REMOVABLE CONTINUOUS-BELT SEPARATION UNIT

[76] Inventor: J. Terrell Williams, P.O. Box 1973, Lake Charles, La. 70602

[21] Appl. No.: 848,806

[22] Filed: May 1, 1997

[51] Int. Cl.$^6$ .......................... B01D 33/04; B01D 33/056
[52] U.S. Cl. ............................ 210/400; 210/783; 175/66; 175/206; 209/272
[58] Field of Search ................................... 210/232, 400, 210/401, 783; 175/66, 206; 209/272

[56] References Cited

U.S. PATENT DOCUMENTS

| | | |
|---|---|---|
| 3,159,574 | 12/1964 | Benson . |
| 3,766,997 | 10/1973 | Heilhecker . |
| 4,096,062 | 6/1978 | Myreen . |
| 4,116,288 | 9/1978 | Love . |
| 4,146,483 | 3/1979 | Lee . |
| 4,350,591 | 9/1982 | Lee . |

FOREIGN PATENT DOCUMENTS 3213280  10/1983  Germany .

Primary Examiner—Thomas M. Lithgow
Attorney, Agent, or Firm—Finnegan, Henderson, Farabow, Garrett & Dunner, L.L.P.

[57] ABSTRACT

A continuous-belt drilling mud separation unit is removably mounted in a box-like housing disposed in the flow path of drilling mud or drilling fluids and is operated by a motor on the housing. The separation unit includes a generally rectangular frame, a tensioning system, and a wide continuous belt in the form of a mesh screen, chain, self-cleaning chain link belt, or combination chain link belt and wire mesh screen which extends around rollers or sprockets and is driven in a continuous loop moving along the longitudinal axis of the frame. As drilling mud or drilling fluids are conducted onto the moving belt, liquids and particles smaller than the openings in the belt pass through the openings and liquids and particles larger than the openings are transported on the moving belt and are discharged off of one end as the belt completes its path. The drilling mud separation system is installed upstream from conventional solids control equipment, such as shale shakers, and removes large amounts of large drill solids and gumbo from the drilling mud or drilling fluid prior to the drilling fluid or drill mud flowing to the conventional solids control equipment. By removing large drill solids and gumbo from the drilling mud or drilling fluid, the present apparatus improves the efficiency and performance and reduces the cost of operating and maintaining the conventional solids control equipment.

3 Claims, 7 Drawing Sheets

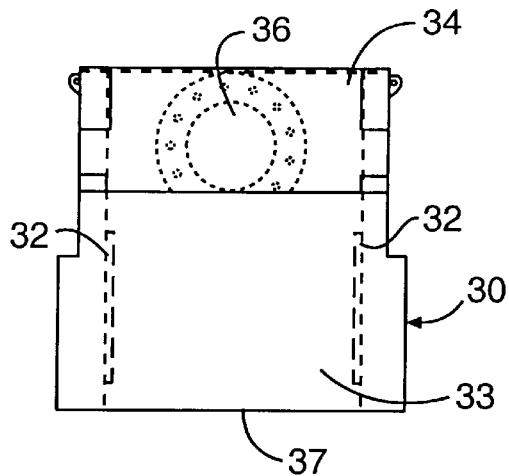
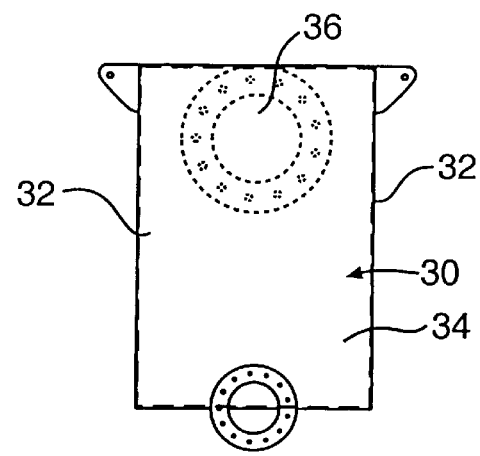
FIG. 9  FIG. 10
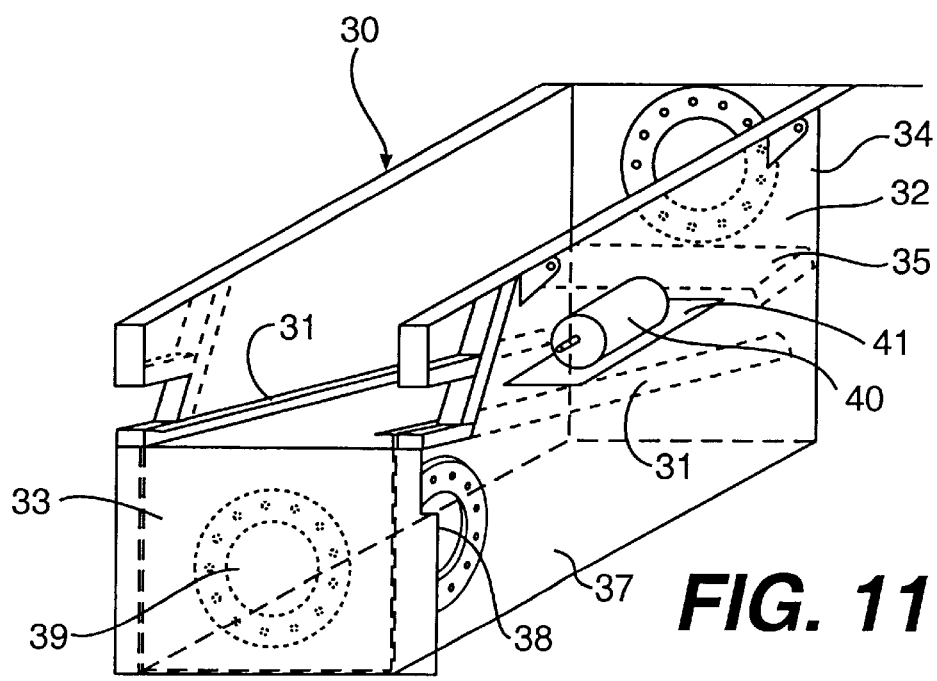
FIG. 11

DRILLING MUD SEPARATION SYSTEM WITH REMOVABLE CONTINUOUS-BELT SEPARATION UNIT

This is a Provisional Application of Ser. No. 60/016,863, filed May 6, 1996.

BACKGROUND OF THE INVENTION

1. Field of The Invention

This invention relates generally to drilling mud separation systems, and more particularly to a drilling mud separation system which utilizes a moving continuous belt in the form of a screen, chain, self-cleaning chain link belt, or combination chain link belt and wire mesh screen to remove large drill solids and gumbo from the drilling mud or drilling fluid prior to the drilling fluid or drilling mud flowing to conventional solids control equipment.

2. Brief Description of the Prior Art

Effective solids control systems for controlling the solids in drilling mud has been a goal in the oilfield industry for many years. Various have been employed to give higher penetration rates, less contamination of formations, lower mud costs, and less abrasives and sticky materials in the mud system. The systems which are most effective require expensive and complicated machinery and require personnel to monitor and maintain the machinery. Common apparatus used for mechanically removing solids from drilling mud include shale shakers and vibratory screens, desanders, desilters, mud cleaners and centrifuges. Each piece of equipment is limited to a range of various particle sizes and selectively reject undesirable solids and retain desirable solids in the drilling fluid.

The shale shakers and mud cleaners employ a vibrating screen to selectively classify particles by size differences. The desander, desilter and centrifuge are usually located downstream from the shale shakers and utilize centrifugal force and mass difference between the solids density and liquid density for solids removal.

The initial removal step in most solids control systems is to conduct the drilling mud from the well directly to a shale shaker. Vibrating screen shale shakers of the type used in the oil industry to fall into three general categories, as described below. "Elliptical motion", or "unbalanced design" shakers have a downward slope on the screen to transport cuttings across the screen an off the discharge end. Optimum screening with these types of shakers is usually in the range of 30–40 mesh (400–600), and they are prone to bearing failure. "Circular motion", or "balanced design" shakers produce a balanced, or generally circular motion. The consistent, circular vibration allows solids transport with the basket in a flat, horizontal orientation. This type of shaker usually has multiple decks to split the solids load and allow the use of finer mesh screens in the range of 80–100 mesh (150–180 microns). "Linear motion", or "straight-line motion" shakers produce a generally straight motion. This motion is developed by a pair of eccentric shafts rotating in opposite directions. Linear motion shakers provide superior cutting conveyance and are able to operate at uphill slope which allows the use of 200 mesh screens (77 microns).

Most prior art shakers tend to force the cuttings upward from the screen surface and as they continue upward the screen travels down, and as the cuttings fall downward, the screen travels upward and strikes the cuttings which chips small pieces off and creates very fine cuttings that are extremely difficult to remove. Shale shakers are prone to short screen life and their vibratory action tends to drive the cuttings into the screen and leads to screen "blinding" resulting in loss of fluid across the screen. "Blinding" is known as the phenomenon where near-size particles plug the screen or the screen becomes coated with sticky particles.

The present invention is not a replacement for the conventional solids control equipment but instead is installed upstream from the conventional solids control equipment and removes large amounts of large drill solids and gumbo from the drilling mud or drilling fluid prior to the drilling fluid or drill mud flowing to the conventional solids control equipment such as shale shakers. The present apparatus utilizes a separation unit removably installed in a box-like housing which receives the drilling mud or drilling fluid from the well separates the large drill solids and gumbo by utilizing a moving continuous belt in the form of a screen, chain, self-cleaning chain link belt, or combination chain link belt and wire mesh screen which moves in an continuous loop. By removing large drill solids and gumbo from the drilling mud or drilling fluid, the present apparatus improves the efficiency and performance and reduces the cost of operating and maintaining the conventional solids control equipment. Removably mounting the separation unit in the box-like housing allows a replacement separation unit to be easily and quickly installed so that operations may continue while the removed separation unit is repaired.

SUMMARY OF THE INVENTION

It is therefore an object of the present invention to provide a continuous-belt drilling mud separation unit which is removably mounted in a box-like housing disposed in the flow path of drilling mud or drilling fluids upstream from conventional solids control equipment, such as shale shakers, and removes large amounts of large drill solids and gumbo from the drilling mud or drilling fluid prior to the drilling fluid or drill mud flowing to the conventional solids control equipment.

It is another object of this invention to provide a continuous-belt drilling mud separation unit which is easily and quickly removed from a box-like housing to allow a replacement separation unit to be easily and quickly installed so that operations may continue while the removed separation unit is repaired.

Another object of this invention is to provide a box-like housing which removably receives, supports and operates a continuous-belt drilling mud separation unit installed therein.

Another object of this invention is to provide a continuous-belt drilling mud separation unit having a tensioning mechanism for applying and maintaining tension in the continuous belt.

Another object of this invention is to provide a continuous-belt drilling mud separation unit having a wide continuous belt in the form of a mesh screen, chain, self-cleaning chain link belt, or combination chain link belt and wire mesh screen which extends around rollers or sprockets and is driven in a continuous loop moving along the longitudinal axis of the frame.

Another object of this invention is to provide a continuous-belt drilling mud separation unit having a wide continuous belt containing a plurality of openings moving in a continuous loop whereby liquids and particles smaller than the openings in the belt pass through the openings and liquids and particles larger than the openings are transported on the moving belt and are discharged off of one end as the foramanous belt completes its path.

A further object of this invention is to provide a continuous-belt drilling mud separation system upstream from conventional solids control equipment to remove large drill solids and gumbo from the drilling mud or drilling fluid and thereby improve the efficiency and performance and reduce the cost of operating and maintaining the conventional solids control equipment.

A still further object of this invention is to provide a continuous-belt drilling mud separation system which is simple in construction, inexpensive to manufacture and operate and is rugged and reliable in operation.

Other objects of the invention will become apparent from time to time throughout the specification and claims as hereinafter related.

The above noted objects and other objects of the invention are accomplished by a continuous-belt drilling mud separation unit removably mounted in a box-like housing disposed in the flow path of drilling mud or drilling fluids which is operated by a motor on the housing. The separation unit includes a generally rectangular frame, a tensioning system, and a wide continuous belt in the form of a mesh screen, chain, self-cleaning chain link belt, or combination chain link belt and wire mesh screen which extends around rollers or sprockets and is driven in a continuous loop moving along the longitudinal axis of the frame. As drilling mud or drilling fluids are conducted onto the moving belt, liquids and particles smaller than the openings in the belt pass through the openings and liquids and particles larger than the openings are transported on the moving belt and are discharged off of one end as the belt completes its path. The drilling mud separation system is installed upstream from conventional solids control equipment, such as shale shakers, and removes large amounts of large drill solids and gumbo from the drilling mud or drilling fluid prior to the drilling fluid or drill mud flowing to the conventional solids control equipment. By removing large drill solids and gumbo from the drilling mud or drilling fluid, the present apparatus improves the efficiency and performance and reduces the cost of operating and maintaining the conventional solids control equipment.

BRIEF DESCRIPTION OF THE DRAWINGS

FIG. 9 is a front elevation of the box-like housing unit.

FIG. 10 is a rear elevation of the box-like housing unit.

FIG. 11 is an isometric view of the box-like housing unit shown from the front end.

DESCRIPTION OF THE PREFERRED EMBODIMENT

Figure 1:
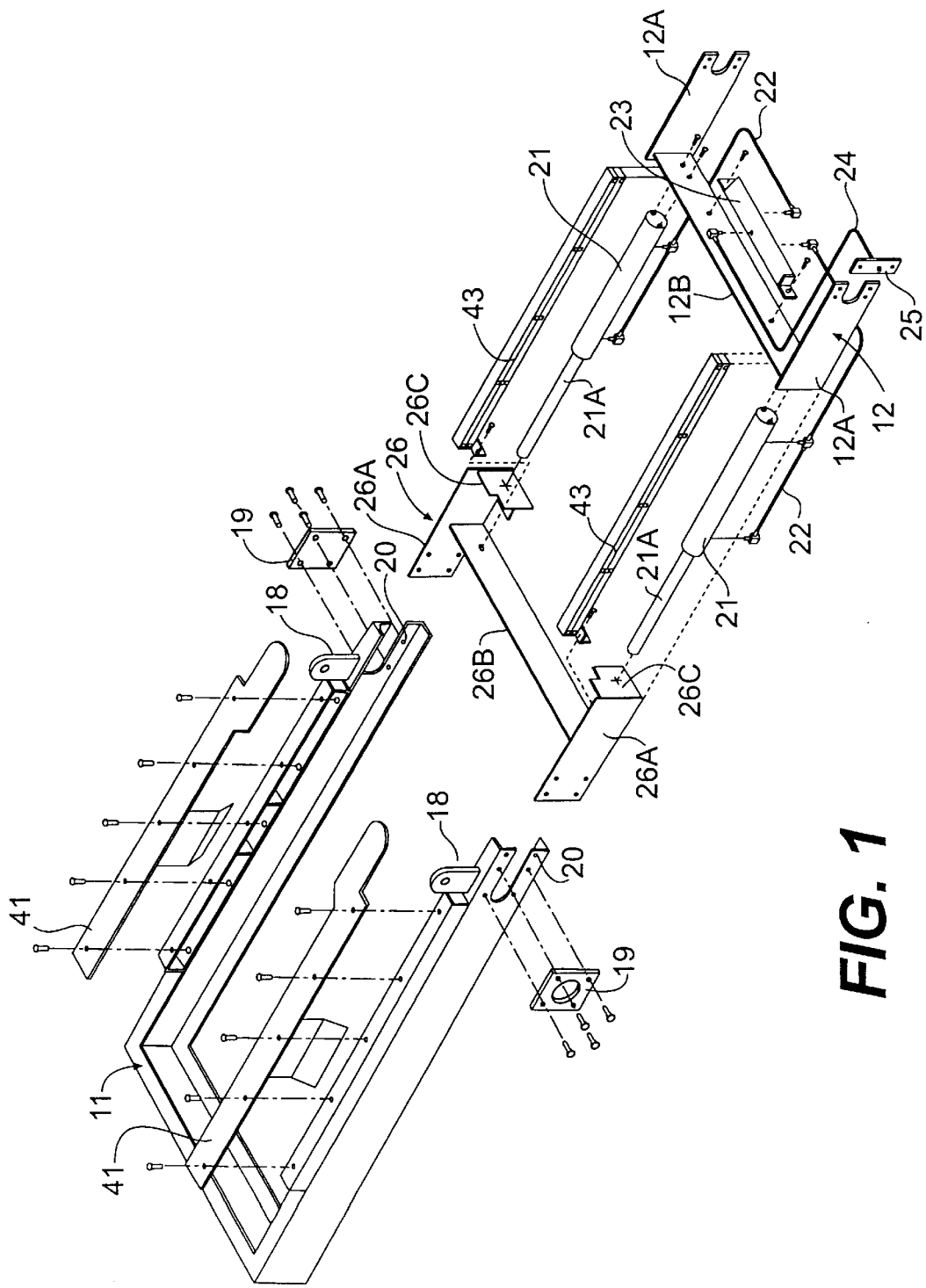
FIG. 1 is an exploded isometric view of the separation unit of the drilling mud and gumbo separation system in accordance with the present invention.

The apparatus of the present invention utilizes a moving continuous belt in the form of a screen, chain, self-cleaning chain link belt, or combination chain link belt and wire mesh screen to remove large drill solids and gumbo from the drilling mud or drilling fluid prior to the drilling fluid or drill mud flowing to conventional solids control equipment such as shale shakers to remove large amounts of large drill solids and gumbo and lessen the stoppage of flow of drilling mud and drilling fluids in the flow lines and thereby improve the performance and reduce the cost of drilling operations.

Referring to the drawings by numerals of reference, the mud separation system in accordance with the present invention includes; (1) a separation unit 10 depicted in FIGS. 1–6 which is installed in (2) a receptacle or box-like housing 30 depicted in FIGS. 7–11. The separation unit 10 includes an outer frame, inner front and rear frames, a tensioning system, a drive system, and a moving continuous belt in the form of a screen, chain, self-cleaning chain link belt or combination chain link belt and wire mesh screen, described hereinafter. The receptacle or box-like housing 30 is mounted in the flow path of the drilling mud or drilling fluids on a drilling rig and serves to operate the separation unit or units 10 to separate gumbo and solids from drilling fluids or drilling muds obtained from a well bore.

Figure 2:
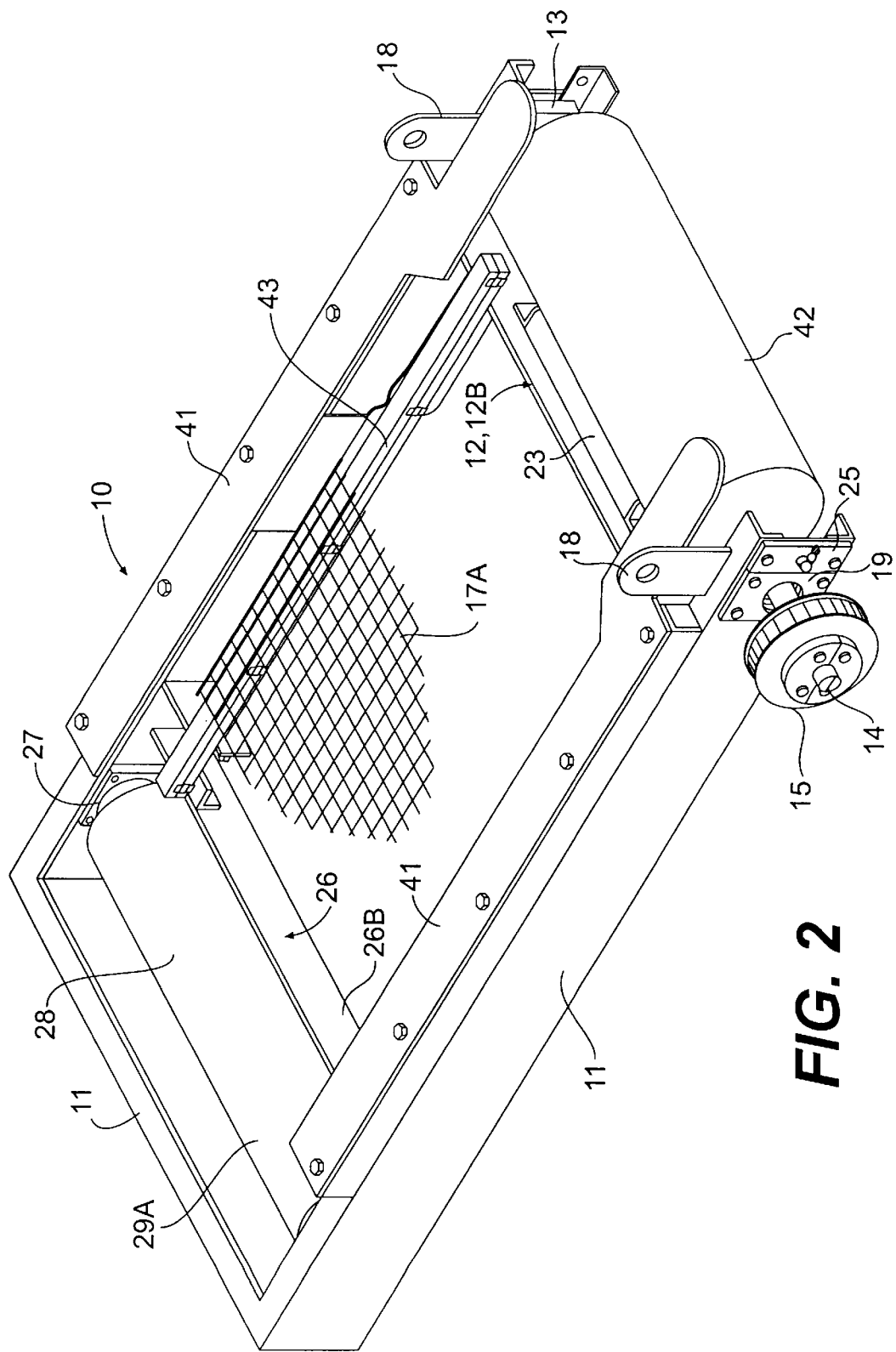
FIG. 2 is an isometric view in the assembled condition of an embodiment of the separation unit having a moving screen.
Figure 3:
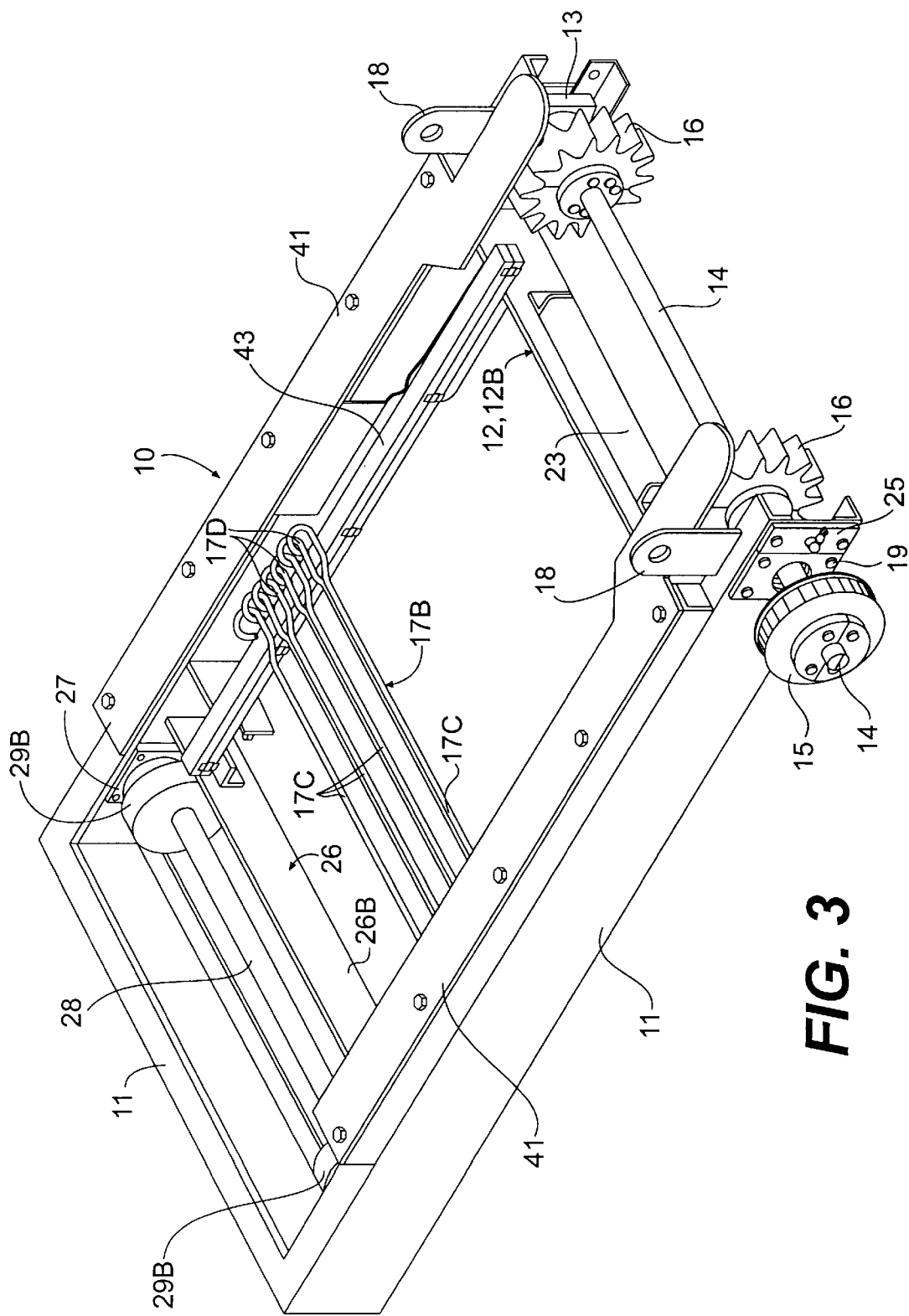
FIG. 3 is an isometric view in the assembled condition of an embodiment of the separation unit having a moving chain.
Figure 5:
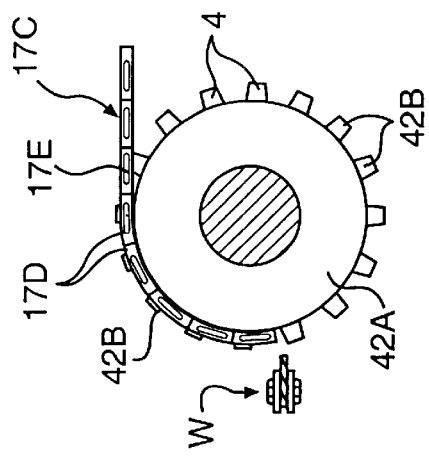
FIG. 5 is a side elevation view of a portion of the self-cleaning chain link belt and toothed drive roller arrangement.
Figure 4:
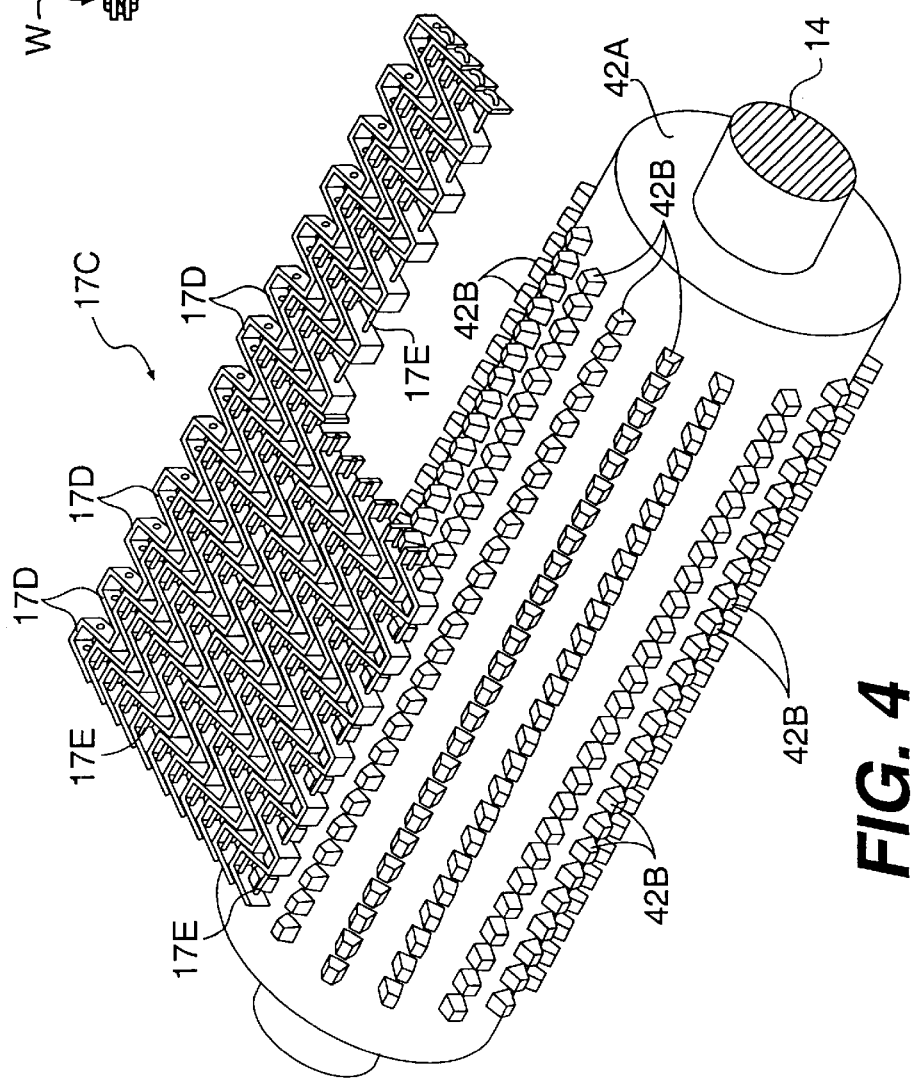
FIG. 4 is an isometric view of a toothed drive roller and self-cleaning chain link belt for use in the separation unit.
Figure 6:
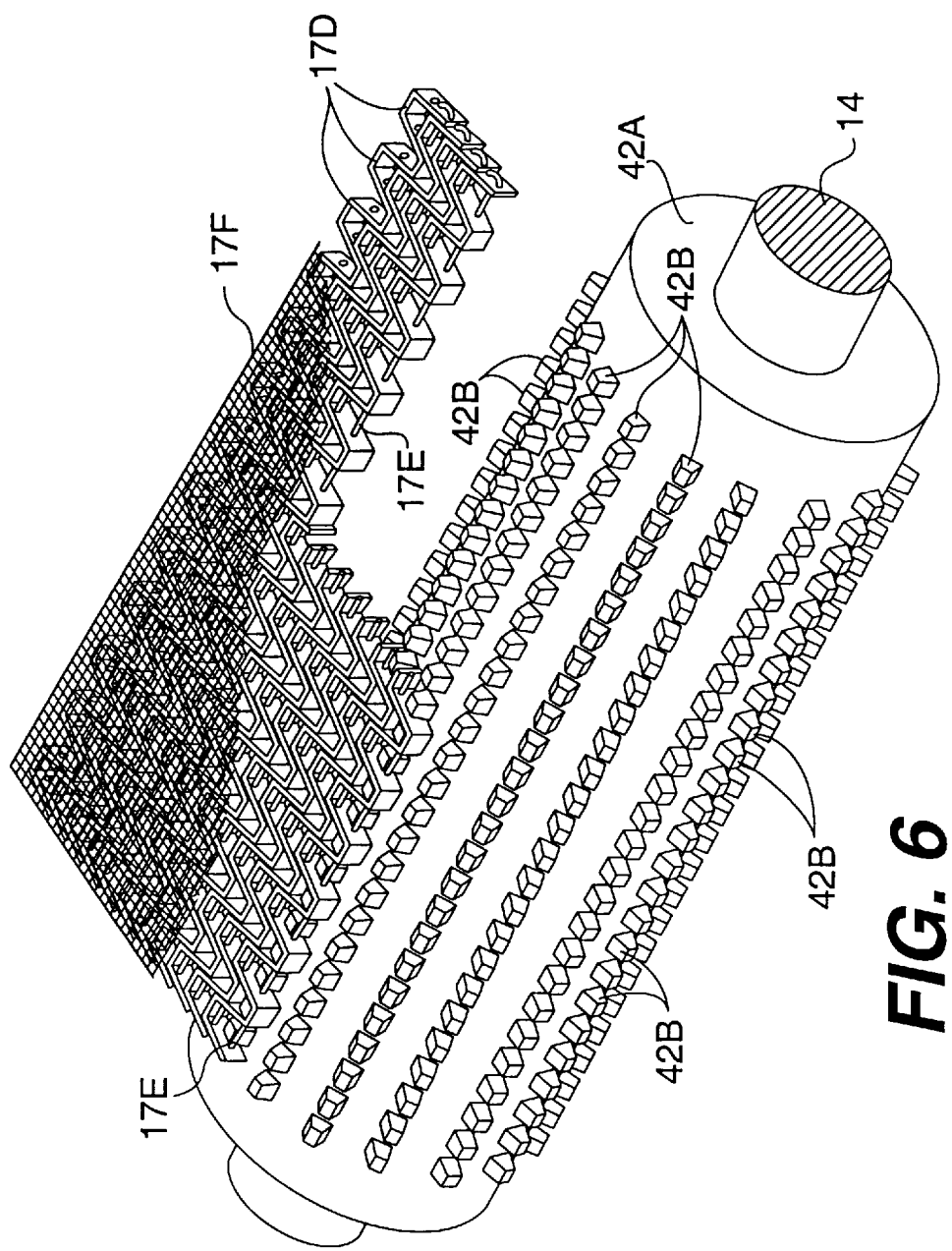
FIG. 6 is an isometric view of the toothed drive roller and a combination self-cleaning chain link belt and wire mesh screen for use in the separation unit.
Figure 7:
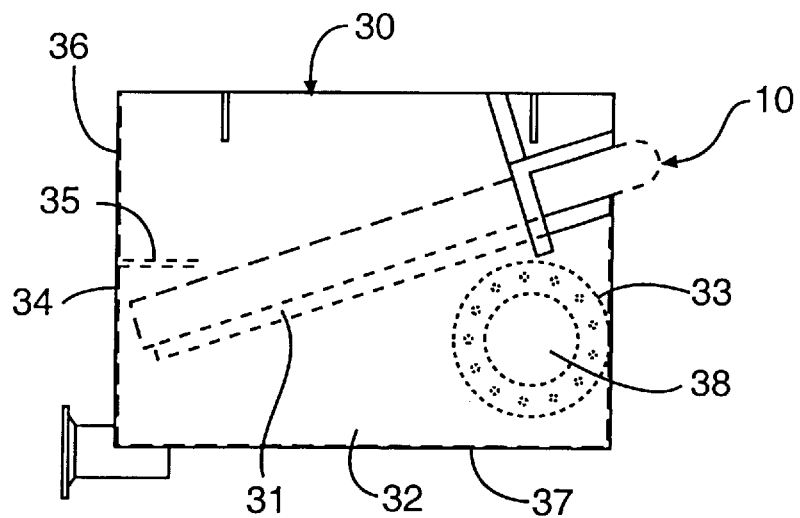
FIG. 7 is a side elevation of the receptacle or box-like housing unit of the system in which the separation unit is mounted.
Figure 8:
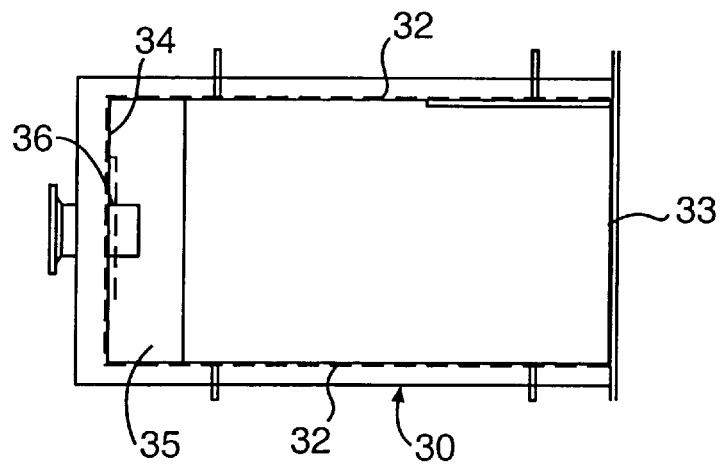
FIG. 8 is a top plan view of the box-like housing unit.

Referring now to FIGS. 1–3, the separation unit 10 of the apparatus has a generally rectangular outer frame assembly 11 formed of C-shaped channel members that supports an inner front frame assembly 12, an inner rear frame assembly 26, and other components. The separation unit 10 is shown in an unassembled condition in FIG. 1, and in an assembled condition in FIGS. 2 and 3. FIG. 2 shows an embodiment of the separation unit 10 having a moving continuous screen belt 17A, and FIG. 3 shows an embodiment having a moving continuous chain belt 17B. The same numerals of reference are used in both embodiments to designate the components common to both. FIGS. 4–6 show a toothed drive roller and self-cleaning continuous chain link belt and combination chain link belt and wire mesh screen modification.

The inner front frame assembly 12 is a generally U-shaped configuration formed of a pair of laterally opposed rectangular side plate members 12A with a transverse rectangular crossmember plate 12B secured between the inner facing ends of the side plates. Front bearings 13 are mounted at the outer ends of the opposed plates 12A (FIGS. 2 and 3). The U-shaped inner front frame assembly 12 carrying the front bearings 13 is fixedly connected to the front end of the outer frame assembly 11 by spacer plates 19. A front drive axle 14 is journalled in the front bearings 13 and its outer ends extend through the front bearings 13 and through the outer frame assembly 11 to receive a drive sheave 15 on either the right or left side of the outer frame 11. Thus, the drive sheave 15 can be located on either the left or the right side of the outer frame 11.

In the embodiment of FIG. 2, a drive roller 42 is connected to the front axle assembly 14 to drive a moving continuous screen belt 17A, and in the embodiment of FIG. 3, drive sprockets 16 are attached to the front axle assembly 14 to drive a moving continuous chain belt 17B.

Lifting eyes 18 are secured to the front end of the outer frame assembly 11 to lift and move the separation unit 10 as required. The inner front frame assembly 12, spacer plates 19, and the front bearings 13 are attached to the outer frame assembly 11 to make the front of the separation unit 10 rigid. Holes 20 are located on the front of the outer frame assembly 11 to attach the inner front frame assembly 12, front bearings 13 and spacer plates 19.

As best seen in FIG. 1, tensioning cylinders 21 are mounted on the inner front frame assembly 12 to create and maintain tension force on the moving screen 17A or chain 17B. Lines 22 connect the tensioning cylinders 21 to a reservoir 23 which is mounted on the transverse crossmember 12B of the inner front frame assembly 12. The reservoir 23 contains a fluid medium (air or hydraulic) with which to operate the tensioning cylinders 21. A line 24 connected to the reservoir 23 extends through a mounting plate 25 attached to the side of the outer frame assembly 11. An air or hydraulic supply line from the rig is connected to the line 24 which in turn activates the tensioning cylinders 21.

The inner rear frame assembly 26 is a generally H-shaped configuration formed of a pair of laterally opposed rectangular side plate members 26A with a transverse rectangular crossmember plate 26B secured between the side plates and laterally opposed end plates 26C secured to the front ends of the side plates. Rear bearings 27 are mounted at the rear ends of the opposed plates 26A (FIGS. 2 and 3). The H-shaped inner rear frame assembly 26 carrying the rear bearings 27 is not rigidly connected to outer frame assembly. Instead, the inner rear frame assembly 26 is slidably received in the C-shaped side channels of the outer frame 11.

A rear axle 28 is journalled in the rear bearings 27. In the embodiment of FIG. 2, an elongate single roller 29A is connected to the rear axle 28 over which the moving screen belt 17A passes, and in the embodiment of FIG. 3, a pair of laterally opposed rollers 29B are attached to the rear axle 28 over which the chain belt 17B passes.

The outer ends of the piston rods 21A of the tensioning cylinders 21 are connected to the end plates 26C at the front ends of the side plates 26B of the inner rear frame assembly 26. The inner rear frame assembly 26 and rear rollers 29A, 29B, are moved along the C-shaped side channels of the outer frame 11 relative to the outer frame by the tensioning cylinders 21.

In the embodiment of FIG. 2, the moving continuous screen belt 17A is in the form of an endless loop and passes around the front drive roller 42 and rear roller 29A. In the embodiment of FIG. 3, the continuous chain belt 17B is formed of a plurality of transverse parallel spaced rod members 17C defining openings therebetween and having jointed links 17D at each end. The links 17D are interconnected such that the transverse rod members 17C are in the form of an endless loop. The links 17C of the chain 17B engage the teeth of the front drive sprockets 16 and pass over the laterally opposed rear rollers 29B.

FIG. 4 shows an alternate embodiment of the front drive roller 42A which is used to drive a continuous self-cleaning chain link belt 17C. The front drive roller 42A is similar to the front drive roller 42 described above with reference to FIG. 2, but has a plurality of longitudinally extending circumferentially spaced rows of radially extending teeth 42B. The self-cleaning chain link belt 17C is a wide endless loop belt formed of a plurality of adjacent jointed chain links 17D hingedly connected together by a plurality of parallel spaced transversely extending rods 17E. The endless loop chain link belt 17C passes around the front drive roller 42A and rear roller 29A (shown in FIG. 2). The jointed chain links 17D are sized and spaced to receive and engage the teeth 42B of the front drive roller 42A. As shown in FIG. 5, the teeth 42B are of sufficient length to protrude slightly beyond the outer surface of the links 17D as they pass around the front drive roller 42A. The toothed front drive roller 42A and chain link belt 17C arrangement is particularly useful in removing gumbo and other large solids which may otherwise stick in the openings of the links and clog the belt. As shown somewhat schematically in FIG. 5, a rectangular wiper blade W formed of resilient elastomeric material sandwiched between two rectangular metal straps may be secured transversely across the front of the frame to wipe the outer surface of the chain link belt 17C as it passes around the drive roller 42A.

FIG. 6 shows a modification of the toothed front drive roller 42A and continuous self-cleaning chain link belt 17C arrangement. In this modification the front drive roller 42A and chain link belt 17C is the same as described above with reference to FIGS. 4 and 5. In this arrangement, an endless loop screen belt 17F formed of wire mesh is installed on the outer surface of the chain link belt 17C. The endless loop chain link belt 17C and screen 17F move together and pass around the front drive roller 42A and rear roller 29A (shown in FIG. 2), and the jointed chain links 17D receive and engage the teeth 42B of the front drive roller 42A, as described above.

It should be understood from the foregoing that the inner rear frame assembly 26 carrying the rear rollers 29A, 29B slides relative to the outer frame 11 and inner front frame assembly 12 upon extension or retraction of the piston rods 21A of the tensioning cylinders 21. When the piston rods 21A are extended the inner rear frame assembly 26 and rear rollers 29A, 29B move rearwardly to apply and maintain tension in the moving screen 17A, chain 17B, chain link belt 17C, or combination chain link belt 17C and screen 17F.

A pair of laterally opposed parallel elongate rectangular guide/support bars 43 are connected at one end to the crossmember 26B of the inner rear frame assembly 26 and extend forward toward the front of the separation unit 10 and over the crossmember 12B of the inner front frame assembly 12 to support the moving screen 17A, chain 17B, chain link belt 17C, or combination chain link belt 17C and screen 17F. The guide/support bars 43 move with the inner rear frame assembly 26 relative to the outer frame 11 as tension is applied or relaxed by the tensioning cylinders 21.

A pair of elongate flat guard rails 41 are mounted at the top ends of the C-shaped channels of the outer frame 11 after the moving screen 17A, chain 17B, chain link belt 17C, or combination chain link belt 17C and screen 17F is installed. The guard rails 41 extend inwardly from the sides of the outer frame assembly 11 over the lateral edges of the moving screen 17A, chain 17B, chain link belt 17C, or combination chain link belt 17C and screen 17F and forwardly over the drive sprockets 16 or the lateral ends of the drive roller 42 or 42A.

The moving screen 17A, chain 17B, chain link belt 17C, or combination chain link belt 17C and screen 17F of the separation unit 10 is driven by a variable or fixed speed external motor 40 mounted in the box-like housing 30 which is releasably connected 40 to the drive sheave 15 on the outwardly extended end of the drive shaft 14.

As briefly stated above, the separation unit 10 is installed in the receptacle or box-like housing 30 depicted in FIGS. 7–11 which is mounted in the flow path of the drilling mud or drilling fluids on a drilling rig and serves to operate the separation unit or units 10 to separate solids from drilling fluids or drilling muds obtained from a well bore.

Referring now to FIGS. 7–11, the receptacle or box-like housing 30 (hereafter referred to as box 30) is mounted on the rig through which the drilling mud or drilling fluids along with materials to be separated flow through from the well bore. The 30 box is mounted to the drilling rig floor by conventional supports and attachments to the floor or may be suspended from overhead or by other means that may be applied by workmen at each work location. The box 30 has laterally opposed side walls 32 connected to a pair of opposed end walls 33 and 34; end wall 33 being the front (discharge end), and end wall 34 being the back (inlet end) of the box.

A pair of elongate laterally opposed parallel rails 31 are mounted on the inside of the opposing side walls 32 at a fixed distance apart to allow the separation unit 10 to be slidably received and supported in the box 30. The parallel rails 31 are fixed in the box 30 at an angle that is preferably 70° to 80° from vertical measuring from the back wall 34 (inlet end) of the box. It should be understood that the separation unit 10 can function satisfactorily at other angles other than the preferred degrees stated above.

The box 30 is configured to facilitate the installation and removal of the separation unit 10 through the front end of the box and allow the front drive axle 14 and drive sheave 15 (FIGS. 2 and 3) of the separation unit 10 to extend through the side of the box. Removably mounting the separation unit in the box-like housing allows a replacement separation unit to be easily and quickly installed in the box so that operations may continue while the removed separation unit is repaired.

The box 30 has a mounting flange or bracket 41 on one or both sides on which a variable or fixed speed drive motor 40 is mounted to drive the separation unit 10. The external drive motor 40 can be located on either side of the box 30 as dictated by the installation of the box 30 at a particular location. The external drive motor 40 may be electrically, hydraulically, or pneumatically powered. The drive sheave 15 of the separation unit 10 is rotated by a belt (not shown) that is driven by the motor 40. Thus, the front drive axle 14 and the moving screen 17A, chain 17B, chain link belt 17C, or combination chain link belt 17C and screen 17F of the separation unit 10, can be driven from the left or right side of the box 30.

The box 30 has a horizontal ledge or shelf 35 which extends inwardly a distance from the back wall 34 (inlet end) to disperse the drilling mud or drilling fluid along with the material to be separated across the separation unit 10 which is supported on the rails 31. The drilling mud or drilling fluid enters the box 30 through an opening 36 in the back wall 34 (inlet end) of the box or it can be directed over the open top end of the box 30 by the existing flow line (which is part of the rig) onto the ledge or shelf 35. The box 30 may be provided with a discharge outlet 37 in the bottom of the box, an outlet 38 on either or both sides of the box, or an outlet 39 in the front wall of the box.

Drilling mud or drilling fluids are obtained from the well bore along with drill solids to be removed from the drilling mud or drilling fluids by mechanical or other means. The drilling mud or drilling fluid flows through, or is circulated through, the existing flowline and into the box 30. The ledge or shelf 35 evens or smooths the flow onto the moving screen 17A, chain 17B, chain link belt 17C, or combination chain link belt 17C and screen 17F.

The moving screen 17A, chain 17B, chain link belt 17C, or combination chain link belt 17C and screen 17F is rotated around the drive roller 42, 42A, or drive sprockets 16 in an endless loop and passes underneath the separation unit 10 toward the rear roller 29A, 29B. The moving screen 17A, chain 17B, chain link belt 17C, or combination chain link belt 17C and screen 17F then passes around the rear roller 29 and moves underneath the flow of drilling mud or drilling fluid from the well bore where large solids and gumbo from the well bore are deposited on the moving screen 17A, chain 17B, chain link belt 17C, or combination chain link belt 17C and screen 17F. The moving screen 17A, chain 17B, chain link belt 17C, or combination chain link belt 17C and screen 17F continues forward movement across the guide/support bars 43 to the front drive roller 42, 42A, or drive sprocket 16.

As the drilling mud or drilling fluids along with the drill solids and gumbo to be separated flow across the moving screen 17A, chain 17B, chain link belt 17C, or combination chain link belt 17C and screen 17F, the liquid part of the drilling mud or drilling fluid along with smaller particles of drill solids fall through the openings of the moving screen 17A, chain 17B, chain link belt 17C, or combination chain link belt 17C and screen 17F into the lower part of the box 30 then exits the box 30 through the discharge outlets 37, 38, or 39 in the box. Larger drill solids and gumbo are caught on the moving screen 17A, chain 17B, chain link belt 17C, or combination chain link belt 17C and screen 17F and are transported to the front of the separation unit 10.

As the moving screen 17A, chain 17B, chain link belt 17C, or combination chain link belt 17C and screen 17F passes under the front drive sprocket 16 or front drive roller 42 or 42A, the large drill solids and gumbo are discharged off the moving screen 17A, chain 17B, chain link belt 17C, or combination chain link belt 17C and screen 17F into a suitable discharge receptacle, pipe, conveyor, or other means as may be provided at each unit location. In the toothed roller 42A and self-cleaning chain link belt 17C, or combination chain link belt 17C and screen 17F arrangement, the teeth 42B of the drive roller 42A are received in the jointed chain links 17D and protrude therethrough to dislodge and remove gumbo and other large solids which may be stuck in the openings of the links to clean and unclog the belt as the links 17D pass around the front drive roller.

It should be understood that as drilling conditions vary such as size of hole drilled, drilling rate, type of drilling fluids or drilling mud used, type of formation drilled, volume of drilling mud or drilling fluids circulated per unit of time such as gallons per minute, the moving screen 17A, chain 17B, chain link belt 17C, or combination chain link belt 17C and screen 17F may be varied in size of spacing between links, joints, mesh of screen or chain along with drive sprockets and/or drive rollers designed for each particular size or type of screen or chain, or the length of the separation assembly may be increased or decreased as well as the width.

The present invention utilizing a moving screen, chain, chain link belt or combination chain link belt and screen to remove large drill solids and gumbo from the drilling mud or drilling fluid prior to the drilling fluid or drill mud flowing to conventional solids control equipment; i.e. shale shakers, has resulted in better performance of the conventional solids control equipment. The removal of large amounts of large drill solids and gumbo lessens the stoppage of flow of drilling mud and drilling fluids in the flow lines and therefore improves the performance and reduces the cost of drilling operations.

While this invention has been described fully and completely with special emphasis upon preferred embodiments, it should be understood that within the scope of the appended claims the invention may be practiced otherwise than as specifically described herein.

I claim:

1. In a drilling mud separation system wherein drilling fluid and drilling mud is conducted from a well bore to solids control equipment; a box-like housing for slidably receiving, supporting, and operating a removable generally rectangular drilling fluid and drilling mud separation unit having a movable continuous belt containing a plurality of openings driven by a drive roller connected with a drive axle, the box-like housing comprising:

a generally rectangular box-like housing having a bottom wall, laterally opposed side walls, a front end wall, and a back end wall;

a first opening adjacent said front end wall sized to receive said generally rectangular separation unit, and a slotted opening in at least one of said opposed side walls through which said separation unit drive axle extends;

a pair of elongate laterally opposed parallel rails mounted on the interior of said housing side walls and having one end adjacent said first opening for slidably receiving and removably supporting said generally rectangular separation unit in an annular position relative to a horizontal axis with an end of said separation unit drive axle extending outwardly through said slotted opening;

drive means disposed on said housing adjacent said slotted opening through which said drive axle extends connected with a power source and operatively connected with said drive axle for rotating said drive axle and said drive roller to move said continuous belt;

inlet means on said housing adapted to receive said drilling fluid and drilling mud conducted from the well bore and direct it onto said continuous belt; and outlet means on said housing adapted to be connected with said solids control equipment for conducting liquids and particles smaller than the openings in said movable continuous belt which pass through said openings to said solids control equipment for further separation;

said box-like housing being stationarily positioned between and connected in fluid communication with said well bore and said solids control equipment, and said removable generally rectangular drilling fluid and drilling mud separation unit is slidably received and supported in said box-like housing, and is slidably removed therefrom; wherein said separation unit is capable of being easily and quickly removed for servicing and replaced by another said separation unit such that drilling operations may continue while said removed separation unit is being serviced.

2. The system according to claim 1 wherein said drive means comprises a motor having a drive shaft connected with a drive sheave installed on said outwardly extended end of said drive axle for rotating said drive axle and said drive roller to move said continuous belt.

3. The system according to claim 1 wherein said inlet means includes a rectangular ledge extending generally horizontally inwardly a distance from said back end wall in the path of said drilling fluid and drilling mud to distribute it substantially evenly across said continuous belt.

\* \* \* \* \*